(12) United States Patent
Kang et al.

(10) Patent No.: US 8,048,936 B2
(45) Date of Patent: Nov. 1, 2011

(54) MICROPOROUS POLYOLEFIN FILM POSSESSING GOOD MECHANICAL PROPERTIES AND THERMAL STABILITY

(75) Inventors: Gwigwon Kang, Daejeon (KR); Jang-Weon Rhee, Daejeon (KR); Inhwa Jung, Chungcheongnam-do (KR); Youngkeun Lee, Seoul (KR); Yongkyoung Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 462 days.

(21) Appl. No.: 12/292,584

(22) Filed: Nov. 21, 2008

(65) Prior Publication Data

US 2009/0148685 A1 Jun. 11, 2009

(30) Foreign Application Priority Data

Nov. 28, 2007 (KR) .................. 10-2007-0121791

(51) Int. Cl.
*C08J 9/00* (2006.01)
*B32B 5/00* (2006.01)

(52) U.S. Cl. ............... 521/122; 428/98; 521/80

(58) Field of Classification Search .................. 521/122, 521/80; 428/98
See application file for complete search history.

(56) References Cited

U.S. PATENT DOCUMENTS

| | | | |
|---|---|---|---|
| 5,641,565 A | 6/1997 | Sogo | |
| 6,127,438 A | 10/2000 | Hasegawa et al. | |
| 6,562,519 B2 | 5/2003 | Yamamoto et al. | |
| 6,949,315 B1 | 9/2005 | Samii et al. | |
| 2005/0277702 A1 | 12/2005 | Lee et al. | |
| 2006/0009538 A1 | 1/2006 | Lee et al. | |
| 2007/0052130 A1* | 3/2007 | Lee et al. | ........... 264/210.7 |
| 2007/0092705 A1 | 4/2007 | Lee et al. | |
| 2007/0190303 A1 | 8/2007 | Lee et al. | |

FOREIGN PATENT DOCUMENTS

| | | |
|---|---|---|
| EP | 1 097 961 | 5/2001 |
| EP | 1 464 669 | 10/2004 |
| JP | 2003-119306 | 4/2003 |
| JP | 4098401 | 3/2008 |
| KR | 10-075009 | 8/2007 |
| WO | 2006/123849 | 11/2006 |
| WO | 2006/123850 | 11/2006 |
| WO | 2007/052663 | 5/2007 |
| WO | 2007/069560 | 6/2007 |

* cited by examiner

*Primary Examiner* — Timothy J. Kugel
(74) *Attorney, Agent, or Firm* — Clark & Brody

(57) ABSTRACT

The present invention relates to a microporous polyolefin film suitable as a separator for batteries and thermal properties thereof. A microporous polyolefin film according to the present invention has a film thickness of 5-40 μm, a porosity of 30%-60%, a permeability of $2.0 \times 10^{-5}$-$8.0 \times 10^{-5}$ Darcy, a maximum pore size determined by the bubble point method of not more than 0.1 μm, a puncture strength of 0.20 N/μm or more at room temperature and 0.05 N/μm or more at 120° C., and a maximum shrinkage ratio in the transverse direction (TD) when subjected to a thickness-normalized external force in TMA (thermo-mechanical analysis) of not more than 0%. With excellent thermal stability at high temperature as well as superior puncture strength and gas permeability, the microporous polyolefin film according to the present invention is suitable for high-capacity, and high-power batteries.

8 Claims, No Drawings

MICROPOROUS POLYOLEFIN FILM POSSESSING GOOD MECHANICAL PROPERTIES AND THERMAL STABILITY

CROSS-REFERENCE TO RELATED APPLICATION

This application claims priority under 35 U.S.C. §119 the benefit of Korean Patent Application No. 10-2007-0121791, filed on Nov. 28, 2007, the entire contents of which are incorporated herein by reference.

BACKGROUND

1. Technical Field

Example embodiments of the present invention relate to a microporous polyolefin film suitable as a separator for batteries and thermal properties thereof. A microporous polyolefin film according to the present invention has a film thickness of 5-40 µm, a porosity of 30%-60%, a permeability of $2.0 \times 10^{-5}$-$8.0 \times 10^{-5}$ Darcy, a maximum pore size determined by the bubble point method of not more than 0.1 µm, a puncture strength of 0.20 N/µm or more at room temperature and 0.05 N/µm or more at 120° C., and a maximum shrinkage ratio in the transverse direction (TD) when subjected to a thickness-normalized external force in TMA (thermo-mechanical analysis) of not more than 0%.

2. Description of the Related Art

Microporous polyolefin film is in wide use for separators for batteries, separation filters, membranes for microfiltration, and the like due to its superior chemical stability and physical properties. Of these, separators for secondary batteries require the highest quality along with the battery safety requirement. Recently, as capacity and output of secondary batteries are improved, requirements for separators with respect to thermal stability of separators and electrical safety of secondary batteries during charge and discharge are becoming stricter. In the case of lithium secondary batteries, poor thermal stability of separators may lead to damage of the separators caused by temperature increase inside the batteries or short circuit between electrodes resulting therefrom. As a result, there is a risk of overheating of the batteries or fire. Further, as the application of the secondary batteries is extended to hybrid cars and other fields, safety of the batteries against overcharge has become an important requirement. Therefore, separators are required to endure the electric voltage caused by overcharge.

The factors affecting the thermal stability of a battery include shut down temperature, melt down temperature and melting shrinkage ratio in the transverse direction (i.e., a direction perpendicular to the winding of electrode/separator) of the separator, strength of the separator at high temperature, and the like.

Shutdown temperature is the temperature at which the micropores of the separator are closed to shut the electric current when the inside of the battery is abnormally overheated. Melt down temperature is the temperature at which the separator is subjected to melting and the electric current flows again (i.e., the temperature at which short circuit occurs between electrodes) when the battery temperature increases beyond the shutdown temperature. To ensure thermal stability of a battery, it is preferred that the shutdown temperature is low and the melt fracture temperature is high.

Melting shrinkage ratio in the transverse direction refers to the degree of shrinkage occurring when the separator is melted. If the melting shrinkage ratio in the transverse direction is large, the edge of the electrodes is exposed as the separator of the battery shrinks at high temperature, resulting in short circuit between electrodes and overheating, fire, explosion, or the like. Even if the separator has a high melt down temperature, a high melting shrinkage ratio in the transverse direction may lead to short circuit between electrodes as the edge of the electrodes is exposed while the separator is melted.

A high strength of the separator at high temperature is required to prevent damage of the separator at high temperature which may result from dendrites produced at the electrodes during charge and discharge of the battery and to, thereby, prevent short circuit between electrodes. A weak strength of the separator at high temperature may lead to short circuit caused by the fracture of the separator. In this case, overheating, fire, explosion, or the like may occur due to short circuit between electrodes.

Therefore, among the above-mentioned requirements of the separator for thermal stability of the battery, the melting shrinkage ratio in the transverse direction and the strength of the separator at high temperature are the most important because they prevent short circuit between electrodes fundamentally.

The approaches of improving thermal stability of a battery by increasing the melt down temperature of the separator includes crosslinking the separator, adding an inorganic material, using a heat-resistant resin, or the like.

The method of crosslinking the separator is disclosed in U.S. Pat. Nos. 6,127,438 and 6,562,519. According to these patents, crosslinking of film is carried out using electron beam irradiation or chemically. However, crosslinking using electron beam irradiation is disadvantageous in that an electron beam irradiation apparatus is required, production rate is limited, and quality unevenness may occur due to nonuniform crosslinking. And, chemical crosslinking is disadvantageous in that the process of extruding and mixing is complicated, it is highly probable that film gelation may occur due to nonuniform crosslinking, and a long time of high-temperature aging is necessary.

U.S. Pat. No. 6,949,315 discloses a method blending UHMW (ultra high molecular weight) polyethylene with 5-15 weight % of an inorganic material such as titanium oxide to improve thermal stability of the separator. However, this method is disadvantageous in that the use of UHMW polyolefin increases load of extrusion reduces mixing performance, and reduces productivity due to insufficient stretching. Further, the addition of inorganic material may lead to poor mixing and nonuniform quality and generating pinholes resulting therefrom, or poor film properties because of lack of compatibility at the interface between the inorganic material and the polymer resin.

U.S. Pat. No. 5,641,565 discloses a method of blending a resin having superior heat resistance. This method requires UHMW polyethylene having a molecular weight of 1,000,000 or higher in order to prevent deterioration of physical properties caused by the addition of the different resins like polypropylene and inorganic material. Further, the overall process is complicated because additional processes are required for extraction and removal of the inorganic material.

In addition to the above-described problems, the aforesaid methods only aim at improving the melt down temperature of the separator, and do not consider the melting shrinkage in the transverse direction or the strength of the separator at high temperature at all. As a consequence, they are limited in improving the thermal stability of batteries and are not widely utilized for commercial purposes.

A method of reducing shrinkage of the separator in the transverse direction is presented in Japanese Patent Laid- Open No. 1999-322989. In this method, the film is stretched only in the longitudinal direction or the total stretch ratio is reduced to reduce the thermal shrinkage in the transverse direction. Accordingly, superior physical properties cannot be attained because the improvement of physical properties achieved through stretching cannot be expected. The products described in the examples have a very low puncture strength at room temperature at about 0.06-0.11 N/μm. Although physical properties at high temperature are not mentioned, improvement of thermal stability of battery at high temperature may not be expected considering that puncture strength tends to decrease as temperature increases.

Although Japanese Patent Publication No. 2003-119306 discloses a separator having a shrinkage ratio less than 1%, separator strength was not measured at all and, in particular, strength at high temperature is not considered at all. Therefore, maximizing battery safety at high temperature may be difficult to be expected.

Another important factor with respect to the safety of a secondary battery is the battery overcharge characteristics. Overcharge characteristics refer to safety against leakage of electrolyte, explosion, fire, or the like when the battery is overcharged. In the current situation where the utilization of high-capacity and high-power batteries is in the increase, for example, in hybrid cars, they are one of important requirements for the batteries. With respect to the improvement of overcharge characteristics of a secondary battery, the presence of excessively large pores in the separator is undesired. In general a large pore is advantageous with respect to the improvement of battery life time and output. However, when the pore size is above a predetermined value, battery safety such as overcharge characteristics may be impaired without further improvement of battery life time or output. The pores inevitably have a size distribution during their formation. If excessively large pores are formed in the separator, they may impair overcharge characteristics of the battery because they provide weak resistance to the electric voltage applied during charging of the battery.

Korean Patent Publication No. 2006-0103932 discloses a separator with a narrow pore size distribution for high voltage resistance and superior shut down performance. However, this patent does not consider the battery safety problem such as overcharge characteristics that may occur when the pore size is excessively large. The reason why the ratio of average pore size to maximum pore size (i.e., pore size distribution) is important is because, as mentioned in the patent, the maximum pore size is an important factor with respect to battery safety such as voltage resistance.

As described above, a separator having low melting shrinkage ratio in the transverse direction as well as high puncture strength at high temperature, which are essential factors required for thermal stability of high-capacity, and high-power secondary batteries, and having an adequate pore size for safety during charge and discharge has not been developed in the related art.

The above information disclosed in this Background section is only for enhancement of understanding of the background of the invention and therefore it may contain information that does not form the prior art that is already known in this country to a person of ordinary skill in the art.

SUMMARY

The inventors of the present invention have carried out researches in order to solve the above-described problems associated with the related art. As a result, they developed a separator for high-capacity, and high-power batteries having high puncture strength and gas permeability and capable of improving battery safety at high temperature and overcharge characteristics.

In preferred embodiments, the present invention provides the followings.

(1) A microporous polyolefin film having a film thickness of 5-40 μm, a porosity of 30-60%, a permeability of $2.0 \times 10^{-5}$-$8.0 \times 10^{-5}$ Darcy, a maximum pore size determined by the bubble point method of not more than 0.1 μm, a puncture strength of 0.20 N/μm or more at room temperature and 0.05 N/μm or more at 120° C., and a maximum shrinkage ratio in the transverse direction when subjected to TMA (thermomechanical analysis) with the external force divided by the thickness of film being 2 mN/μm of not more than 0%.

(2) The microporous polyolefin film as set forth in (1), which has a shrinkage ratio in the transverse and longitudinal directions of not more than 10% when kept at 120° C. for an hour.

(3) The microporous polyolefin film as set forth in (1), which has an average pore size measured by the half dry method of 0.02-0.06 μm.

(4) The microporous polyolefin film as set forth in (3), which has a maximum shrinkage ratio in the transverse direction when subjected to TMA, with the external force divided by the thickness of the film being 1.5 mN/μm, of not more than 0%.

(5) The microporous polyolefin film as set forth in (3), which has a maximum shrinkage ratio in the transverse direction when subjected to TMA, with the external force divided by the thickness of the film being 1.3 mN/μm, of not more than 0%.

DETAILED DESCRIPTION OF EMBODIMENTS

Hereinafter, reference will now be made in detail to various embodiments of the present invention, examples of which are illustrated in the accompanying drawings and described below. While the invention will be described in conjunction with example embodiments, it will be understood that the present description is not intended to limit the invention to those example embodiments. On the contrary, the invention is intended to cover not only the example embodiments, but also various alternatives, modifications, equivalents and other embodiments, which may be included within the spirit and scope of the invention as defined in the appended claims.

The microporous polyolefin film of the present invention has a film thickness of 5-40 μm. Considering film strength, battery weight and battery safety, a film thickness of 5-30 μm is preferred and, and a film thickness of 7-25 μm is more preferred. If the film thickness is smaller than 5 μm, safety may not be ensured because resistance to external stress during the manufacture of the battery and dendrites generated during the charge and discharge of the battery may be deteriorated. And, if the film thickness is larger than 40 μm, permeability may be deteriorated and the battery may be excessively bulky.

The microporous polyolefin film of the present invention has a porosity of 30-60%. Considering film strength and ion conductivity inside the battery, a porosity of 40-60% is preferred. When the porosity is less than 30%, battery characteristics may be deteriorated due to low permeability. And, when the porosity is more than 60%, sufficient strength to ensure battery stability may not be attained.

The microporous polyolefin film of the present invention has a permeability of $2.0\ 10^{-5}$-$8.0\ 10^{-5}$ Darcy. Considering film strength required to ensure battery safety and electrical properties, a permeability of $2.0\ 10^{-5}$-$7.0\ 10^{-5}$ Darcy is preferred, and a permeability of $2.5 \times 10^{-5}$-$7.0 \times 10^{-5}$ Darcy is more preferred. If the permeability is lower than $2.0 \times 10^{-5}$ Darcy, electrical properties may be deteriorated because of poor ion permeability. A permeability exceeding $8.0 \times 10^{-5}$ Darcy is excessively high. In this case, safety may not be ensured because the pore structure becomes weak.

The microporous polyolefin film of the present invention has a maximum pore size determined by the bubble point method of not more than 0.1 μm, and an average pore size determined by the half dry method of 0.02-0.06 μm, preferably 0.03-0.06 μm. If the average pore size is smaller than 0.02 μm, battery output cannot be improved above a predetermined level because the number of ions that can pass the film at once is restricted. Further, the pores may be blocked easily by impurities formed during charge and discharge, resulting in reduced battery capacity and battery life time. And, if the average pore size is larger than 0.06 μm, it is highly probable that pores with a pore size of 0.1 μm or more exist in the film. In this case, overcharge characteristics of the battery may be deteriorated and battery safety may not be ensured because of decreased voltage resistance.

The microporous polyolefin film of the present invention has a puncture strength at room temperature of 0.20 N/μm or more, preferably 0.22-0.50 N/μm, more preferably 0.24-0.50 N/μm. When the puncture strength is below 0.20 N/μm, battery safety may not be ensured because the battery has low resistance to external impact which may occur during manufacturing the battery.

The microporous polyolefin film of the present invention has a puncture strength of 0.05 N/μm or more, preferably 0.10-0.30 N/μm, at 120° C. If the puncture strength at 120° C. is lower than 0.05 N/μm, safety may not be ensured because the separator may be damaged at high temperature due to dendrites formed during charge and discharge.

The microporous polyolefin film of the present invention has a maximum shrinkage ratio in the transverse direction when subjected to TMA (thermo-mechanical analysis) under a thickness-normalized external force of not more than 0%. TMA is the technique of measuring the shrinkage of a sample by heating the sample under a constant applied force. The degree of shrinkage changes depending on the applied force. The applied external force should be normalized with respect to sample thickness, because the degree of shrinkage varies greatly depending on the thickness even under the same force. The separator according to the present invention has a maximum shrinkage ratio in the transverse direction when subjected to TMA, with the external force divided by the thickness of the film (applied force/sample thickness) being 2 mN/μm, of not more than 0%. Preferably, it has a maximum shrinkage ratio in the transverse direction when subjected to TMA at a thickness-normalized external force of 1.5 mN/μm of not more than 0%. More preferably, it has a maximum shrinkage ratio in the transverse direction when subjected to TMA at a thickness-normalized external force of 1.3 mN/μm of not more than 0%. If the shrinkage ratio in the transverse direction at 2 mN/μm is 0% or more, the edge portion of the electrodes may be exposed when the separator of the battery melts and shrinks at high temperature, resulting in short circuit between electrodes and deteriorating battery safety.

In the absence of stress, it is preferable that the shrinkage ratio in the transverse and longitudinal directions at 120° C. is not more than 10%, more preferably not more than 8%, respectively. If the shrinkage ratio is 10% or more, battery safety may not be ensured because short circuit may occur between electrodes due to the shrinkage.

The polyolefin used in the present invention may be a polyolefin homopolymer or copolymer comprising ethylene, propylene, α-olefin, 4-methyl-1-pentene, etc. as monomer and comonomer, e.g., polyethylene, polypropylene, poly-4-methyl-1-pentene, etc., or a mixture thereof. Examples of preferred polyolefin considering strength, mixing performance of extrusion and stretchability include a high density polyethylene with a comonomer content of less than 2%, having a weight average molecular weight of $2 \times 10^5$-$4.5 \times 10^5$, preferably $2 \times 10^5$-$4.0 \times 10^5$. If the molecular weight is smaller than $2 \times 10^5$, the separator may have a weak strength. And, if the molecular weight is larger than $4.5 \times 10^5$, appearance and uniformity of the separator may be not good due to poor extrusion blendability and stretchability.

A process for preparing the separator of the present invention comprises the steps of:

(a) melting, blending and extruding a mixture of 20-55 weight % of polyolefin (component I) and 80-45 weight % of a diluent (component II) which is liquid-liquid phase-separable from the polyolefin at 160-280° C. at a temperature equal to or higher than the liquid-liquid phase separation temperature in an extruder so as to form a thermodynamically single phase;

(b) passing the resultant melt through a zone controlled within the liquid-liquid phase separation temperature range so as to perform liquid-liquid phase separation;

(c) extruding the melt prepared in the step (b) through, for example, a T-die so as to obtain a sheet;

(d) stretching the sheet at least 4 times in the longitudinal and transverse directions, respectively, with a total stretch ratio of 25-60 times, by sequential or simultaneous stretching including roll type or tenter type;

(e) extracting the diluent from the stretched film while applying a constant tension and drying the same; and (f) heat setting the dried film, for example, by removing residual stress so as to reduce the shrinkage ratio of the film.

Hereinafter, the steps (a) through (f) will be described in detail.

In the step (a) of melting, blending and extruding the polyolefin (component I) and the diluent (component II), the proportion of polyolefin is preferably 20-55 weight %. If the proportion of polyolefin is below 20 weight %, strength and mixing performance of the microporous film may not be attained. And, if the proportion of polyolefin is above 55 weight %, extrusion and moldability may be deteriorated and permeability of the separator may decrease significantly.

When the polyolefin and the diluent which is liquid-liquid phase-separable from the polyolefin but may form a single phase at high temperature are melted and blended at high temperature so as to form a thermodynamically single phase, and then cooled slowly, phase separation of the polyolefin and the diluent occurs in liquid state before the polyolefin is crystallized. One of the two separated phases is a polyolefin rich phase mostly consisting of the polyolefin and containing a small amount of the dissolved diluent, and the other is a diluent rich phase consisting of the polyolefin and the diluent. When the thermodynamically separated two phases are mobile, phase aggregates over time. Due to this coarsening action, each of the separated phases becomes larger in size. The size and composition of the phase resulting from this coarsening action are dependent on the residence time in the liquid-liquid phase separation process and the temperature at which the liquid-liquid phase separation is maintained. After performing the liquid-liquid phase separation as wanted, the melt is completely cooled so as to solidify the polyolefin rich phase. Then, the diluent rich phase is extracted using an organic solvent to obtain a microporous polyolefin film.

Basic physical properties of the microporous film are determined by the concentration of the polyolefin in the polyolefin rich phase during the phase separation. If the phase separation is performed sufficiently and the concentration of the polyolefin in the polyolefin rich phase is high enough, mobility of the polyolefin chains decreases during stretching, which results in the effect of increased forced orientation. As a result, mechanical strength is improved after the stretching. Further, the presence of the polyolefin in the polyolefin rich phase may lead to the formation of crystals with a high melting point during the crystallization process, thereby improving thermal stability of the microporous film. And, the basic pore structure of the microporous film is determined during the phase separation process.

The diluent used in the present invention may be any organic liquid compound which is liquid-liquid phase separable from the polyolefin at 160-280° C. when it is mixed with 20-55 weight % of the polyolefin to make a total of 100%. Examples include a phthalic acid ester such as dibutyl phthalate, dihexyl phthalate, dioctyl phthalate, etc.; an aromatic ether such as diphenyl ether, benzyl ether, etc.; a $C_{10}$-$C_{20}$ fatty acid such as palmitic acid, stearic acid, oleic acid, linoleic acid, linolenic acid, etc.; a $C_{10}$-$C_{20}$ fatty acid alcohol such as palmitic acid alcohol, stearic acid alcohol, oleic acid alcohol; and a fatty acid ester prepared from the esterification of one or more saturated or unsaturated $C_4$-$C_{26}$ fatty acid with a $C_1$-$C_{10}$ alcohol having 1-8 hydroxyl groups, such as palmitic acid mono-, di- or triester, stearic acid mono-, di- or triester, oleic acid mono-, di- or triester, linoleic acid mono-, di- or triester, etc. If the requirement of liquid-liquid phase separation from the polyolefin at 160-280° C. is satisfied, a mixture of the aforesaid materials may be used. Particularly, one or more of paraffin oil, mineral oil or wax may be mixed thereto.

If the liquid-liquid phase separation temperature is below 160° C., the temperature at the rear part of the extruder should be lowered sufficiently below 160° C. to ensure sufficient liquid-liquid phase separation. In this case, the polyethylene may not be melted sufficiently because the extrusion has to be carried out near the melting temperature of the polyethylene and the polyethylene may have an excessively high viscosity. This will give a mechanical load to the extruder, and normal extrusion processing may be impossible because the sheet surface becomes rough. And, if the liquid-liquid phase separation temperature is above 280° C., blending has to be carried out at a temperature higher than 280° C. so as to form a thermodynamically single phase during the initial extrusion. In this case, wanted physical properties may not be attained because the oxidative decomposition of the mixture occurs excessively because the temperature is too high.

General additives used to improve certain properties, e.g., an oxidation stabilizer, a UV stabilizer, an antistatic, etc., may be included in the composition within an amount range not significantly deteriorating the characteristics of the separator.

The mixture is melted and mixed at a temperature higher than the liquid-liquid phase separation temperature using a twin screw compounder, blender, Banbury mixer, etc. specially designed for the mixing of the diluent with the polyolefin so as to obtain a single-phase mixture. Thus obtained single-phase melt is passed through a zone maintained at a temperature below the liquid-liquid phase separation temperature for a residence time longer than 30 seconds, such that liquid-liquid phase separation may occur.

The resultant liquid-liquid phase-separated mixture is extruded and cooled as it passes through a T-die and is formed into a sheet. The polyethylene may be blended with diluents before being supplied to the compounder, or they may be supplied separately from different feeders.

The step (c) of forming the sheet from the melt using a T-die may be carried out by usual water- or air-cooling casting or calendering. As the melt exiting out of the T-die is processed by casting or calendaring, the melt is stretched in the longitudinal direction such that the width of the sheet after the processing is about 10-25% narrower than that of the melt exiting out of the T-die. As a consequence, the resin is oriented in the longitudinal direction. Once the resin in the sheet is oriented in the longitudinal direction, the orientation of the resin in the separator in the transverse direction becomes less than that of the sheet which was not stretched in the longitudinal direction, even when stretching is carried out in the transverse direction in the following stretching process. The separator with less orientation in the transverse direction shrinks less in the transverse direction when it is melted by at elevated temperature. As a result, the shrinkage ratio in the transverse direction decreases.

The step of stretching the sheet may be performed by sequential or simultaneous stretching including roll type or tenter type. Preferably, the stretch ratio is at least 4 times in the longitudinal and transverse directions, respectively, and the total stretch ratio is 25-60 times. If the stretch ratio in either direction is less than 4 times, orientation of the polyolefin in the separator may be insufficient. As a consequence, physical properties of the separator may be deteriorated and puncture strength may not be ensured at high temperature because the melting temperature of the polyolefin in the separator is not high. In general, the melting temperature of the separator increases as the degree of orientation of the semicrystalline polymer increases, and a separator having a high melting temperature ensures good puncture strength at high temperature because the puncture strength does not decrease a lot as compared to a separator having a low melting temperature. If the total stretch ratio is less than 25 times, stretching may be insufficient and physical properties may be not good. And, if the total stretch ratio exceeds 60 times, fracture may occur during stretching and shrinkage ratio of the film may increase.

The TMA shrinkage ratio in the transverse direction of the separator is largely affected by the orientation of the resin during the stretching process. In order to ensure low TMA shrinkage ratio in the transverse direction as well as superior mechanical properties, the orientation of the resin should be above a certain degree, and the orientation in the transverse direction should be less than that in the longitudinal direction. Accordingly, the stretch ratio preferred with respect to the present invention is 6-10 times in the longitudinal direction and 4-7 times in the transverse direction. Further, the proportion of the longitudinal direction stretch ratio to the transverse direction stretch ratio (stretch ratio in the longitudinal direction/stretch ratio in the transverse direction) should be 1.3-2.3. That is, the stretch ratio in the longitudinal direction should be always greater than the stretch ratio in the transverse direction by 1.3-2.3 times. If the proportion is smaller than 1.3, battery stability may not be ensured because the TMA shrinkage ratio in the transverse direction is too large. And, if the proportion is larger than 2.3, the handling of the separator may be difficult because the separator has excessively weak mechanical strength in the transverse direction and it may become vulnerable to the external stress applied in the transverse direction. The stretching temperature may vary depending on the composition of the resin and the diluent. In general, a stretching temperature lower than the melting temperature of the polyethylene itself by 3-20 degrees is preferred. If the stretching is performed at a temperature above the temperature which is lower than the melting temperature of the polyethylene itself by 3 degrees, nonuniform stretching may occur because the film strength inside the stretching machine is too weak. And, if the stretching is performed at a temperature below the temperature which is lower than the melting temperature of the polyethylene itself by 20 degrees, product quality may be deteriorated due to the presence of relatively large holes such as pin holes and fracture of the sheet may occur frequently during processing.

In the step (e), the diluent is extracted from the stretched film using an organic solvent, and the film is dried. During the extraction and drying, the stretched film shrinks in the longitudinal and transverse directions. In the present invention, in order to improve physical properties by increasing orientation in the longitudinal direction and decreasing that in the transverse direction and to reduce TMA shrinkage ratio in the transverse direction, a tension is applied in the longitudinal direction during the extraction and drying. That is, stretching in the longitudinal direction is increased by about 0-5% and a shrinkage of about 8-15% is induced in the transverse direction. As a consequence, the stress applied to the resin in the stretched film is lessened in the transverse direction, and, as a result, TMA shrinkage ratio of the separator in the transverse direction is decreased. If the inducement of shrinkage in the transverse direction is less than 8%, the separator may have a large shrinkage ratio. And, if the inducement of shrinkage in the transverse direction is more than 15%, permeability of the separator may decrease. The organic solvent that can be used in the present invention is not particularly restricted, but may be any solvent that can extract the diluent included in the resin. Suitable solvents include methyl ethyl ketone, methylene chloride, hexane, etc., which provide good extraction efficiency and are dried quickly. The extraction can be performed by any common solvent extraction method, including immersion, solvent spraying, ultrasonication, or the like. These methods may be used alone or in combination. The residual diluent content after the extraction should be not more than 2 weight %. If the residual diluent content exceeds 2 weight %, physical properties may be deteriorated and film permeability may decrease. The amount of the residual diluent (i.e., the extraction efficiency) varies a lot depending on the extraction temperature and extraction time. A high extraction temperature is preferred when considering solubility of the diluent in the solvent. However, an extraction temperature of 40° C. or below is preferred when considering the safety issue associated with the boiling of the solvent. The extraction temperature should be higher than the solidification temperature because the extraction efficiency decreases remarkably if it is below the solidification temperature. The extraction time may vary depending on the film thickness. In case of a usual microporous film having a thickness of 10-30 μm, an extraction time of 2-4 minutes will be adequate.

In the step (f), the dried film is heat-set. That is, residual stress is removed so as to reduce the shrinkage ratio of the film. In the heat setting process, the film tending toward shrinkage is forcibly fixed while heating so as to eliminate the residual stress. The heat-setting temperature and the degree of fixing affect the shrinkage ratio and the puncture strength at high temperature. If the heat-setting temperature is high, shrinkage ratio decreases and puncture strength at high temperature is improved because the stress applied to the resin decreases. The puncture strength tends to decrease at higher temperature, because the stress applied to the resin is relieved. However, if the heat-setting temperature is high, the stress is sufficiently relieved during heat setting. As a result, the reduction of the stress associated with temperature increase is not so large, and, thus, the puncture strength remains high even at high temperature. However, if the heat-setting temperature is too high, permeability may decrease because the micropores may be blocked as the film is partly melted. Preferably, the heat-setting temperature is selected such that 10-30 weight % of the crystalline portion of the film is melted. If the heat-setting temperature is lower than the temperature at which 10 weight % of the crystalline portion of the film is melted, the effect of the elimination of residual stress may be insignificant because the reorientation of the polyethylene molecules in the film is insufficient. And, the heat-setting temperature is higher than the temperature at which 30 weight % of the crystalline portion of the film is melted, permeability may decrease because the micropores may be blocked due to the partial melting. During the heat setting, a tenter type machine is used. Through consecutive heat setting, mechanical properties such as tensile strength and puncture strength are improved and shrinkage ratio is reduced. At the first stage of the heat setting, the film is stretched by 20-50% in the transverse direction so as to improve permeability, tensile strength and puncture strength. If stretching is performed by more than 50%, shrinkage ratio may increase although permeability and tensile strength are improved. Further, TMA shrinkage ratio in the transverse direction may increase because of increased orientation in the transverse direction, and pore size may increase excessively. At the second stage, the width of the stretched film is shrunk by about 15-40%. That is, under application of heat, stress is relieved through shrinking in the transverse direction, and orientation of the resin is relieved to reduce total shrinkage ratio and TMA shrinkage ratio in the transverse direction. If the width of the film is shrunk by more than 40%, permeability and puncture strength may decrease excessively. And, if the width of the film is shrunk by less than 15%, total shrinkage ratio and shrinkage ratio in the transverse direction may increase because stress and orientation of the resin are not relieved, and battery stability may not be ensured because the pore size increases. The heat-setting time may be relatively short if the heat-setting temperature is high, and may be relatively long if the heat-setting temperature is low. Preferably, a heat-setting time of 15 seconds to 2 minutes may be adequate.

Preferably, the steps of stretching, extraction and heat setting are carried out continuously.

As seen in Table 1 below, the microporous polyolefin film prepared in accordance with the present invention has excellent thermal stability at high temperature as well as superior permeability and strength, and is suitable for high-capacity, and high-power batteries.

EXAMPLES

The following examples illustrate the present invention more specifically, but are not intended to limit the scope of the present invention.

1. Molecular Weight

Molecular weight and molecular weight distribution of the polyolefin were determined using a high-temperature GPC (gel permeation chromatography) system available from Polymer Laboratory.

2. Porosity (%)

Porosity was calculated from the space in the separator. The sample was cut to a size of A cm B cm (thickness: T μm). After measurement of weight, porosity was calculated from the proportion of the weight of a resin having the same volume to the weight (Mg) of the separator, using the following equation.

$$\text{Porosity (\%)} = 100[1 - M10000/(ABT\rho)]$$

where $\rho$ (g/cm$^3$) is the density of the resin.

3. Gas Permeability (Darcy)

Gas permeability was measured using a porometer (CFP-1500-AEL available from PMI). Gas permeability is commonly presented as Gurley number. But, the Gurley number is inconvenient in finding out the relative permeability associated with the pore structure of the separator itself, because it does not consider the effect by the thickness of the separator. To circumvent this problem, Darcy's permeability constant was used, instead. Darcy's permeability constant is calculated by the following equation. Nitrogen was used for the measurement.

$$C=(8FTV)/[\pi D^2(P^2-1)]$$

where
C=Darcy's permeability constant,
F=flow rate,
T=sample thickness,
V=viscosity of gas (0.185 for $N_2$),
D=sample diameter, and
P=pressure.

In the present description, an average of Darcy's permeability constant in the region 100-200 psi was used.

4. Average pore size and maximum pore size

Average pore size and maximum pore size were determined according to ASTM F316-03 using a porometer (CFP-1500-AEL available from PMI). Average pore size was measured by the half dry method, and the maximum pore size by the bubble point method. For the pore size measurement, Galwick solution (surface tension=15.9 dyne/cm) available from PMI was used.

5. Puncture Strength

A pin having a diameter of 1 mm and a radius of curvature of 0.5 mm was mounted on a UTM (universal testing machine) available from Instron, and the strength of the separator was measured while puncturing it at a speed of 120 mm/min, at 23° C.

6. Puncture Strength at High Temperature

The same instrument used in the above measurement of puncture strength was used. A pin and a sample support were placed in an oven maintained at 120° C. The strength of the separator was measured while puncturing it at a speed of 120 mm/min. For temperature stabilization, puncture strength was measured after keeping the sample at the temperature for at least 3 minutes. 5 minutes is preferred when considering the effect of temperature stabilization and time efficiency.

7. Shrinkage Ratio in the Transverse Direction in TMA (thermo-mechanical analysis)

TMA was carried out in order to measure shrinkage in the transverse direction during heating of the separator and shrinkage in the transverse direction of the melted separator. TMA/SDTA840 available from Mettler Toledo was used for the measurement. Under an external stress in the transverse direction, the change in length in the transverse direction was observed while heating the sample from 30° C. to 160° C. at a rate of 5° C./min. The sample size was 15 mm in the transverse direction and 6 mm in the longitudinal direction. The result was represented as the percentage of the change of the length from the initial sample length. When the sample shrank, the shrinkage ratio became a positive (+) value. And, when the separator was melted at elevated and its length increased, the shrinkage ratio became a negative (−) value. The related equation is as follows.

Shrinkage ratio (%)=100(Initial length−Sample length at each temperature)/Initial length 8. Shrinkage Ratio at 120° C.

The separator was cut to a size of 15 cm 15 cm. Lines were drawn on the sample with a spacing of 10 cm in the longitudinal and transverse directions. The sample was interposed between two sheets of paper and subjected to temperature stabilization in an oven of 120° C. After 60 minutes, the change of the spacing was measured to calculate the shrinkage ratio. The equation for calculating the shrinkage ratio is as follows.

Shrinkage ratio (%)=100 (Initial spacing−Spacing after keeping at 120° C.)/Initial spacing 9. Overcharge Test Overcharge test was performed as follows in order to confirm the battery safety. A cathode was prepared with a size of 112 mm 77 mm by coating both sides of aluminum foil with $LiCoO_2$. An anode was prepared with a size of 115 mm 77 mm by coating both sides of graphite with copper. The cathode, the anode and the separator were stacked in the following sequence, pressed, and put in a plastic-coated aluminum pouch. Then, electrode tabs from the cathode and the anode were joined by welding.

(C/2)/S/A/S/C/S/A/S−/C/S/A/S/(C/2)

where
(C/2): one side-coated cathode,
C: both sides-coated cathode,
A: both sides-coated anode, and
S: separator.

The electrolyte injected in the battery cell was prepared by dissolving $LiPF_6$ in a 3:4 mixture solution of ethylene carbonate and ethyl methyl carbonate to a concentration of 1.4 mol/L. The electrolyte was injected into the aluminum pouch containing the electrodes and the separator and sealed to prepare a lithium ion battery. All these procedures were carried out inside a glove box in order to prevent the penetration of moisture.

Thus prepared lithium ion battery was charged to 4.2 V by applying an electric current of 200 mA and discharged to 3 V at an electric current of 200 mA. After this charge-and-discharge cycle, the battery was charged to 4.2 V by applying a constant electric current of 1000 mA. While maintaining the voltage constant, the battery was allowed to stand until the electric current decreased to 30 mA. Then, while raising the voltage up to 5.2 V with an electric current of 1000 mA, safety against overcharge was checked by observing the appearance and temperature change of the battery. Poor overcharge characteristics may lead to an early explosion of the battery or fire.

Example 1

High density polyethylene having a weight average molecular weight of 2.1 $10^5$ and a melting temperature of 135° C. was used as component I, and a 2:1 mixture of paraffin oil having a dynamic viscosity of 160 cSt at 40° C. and dibutyl phthalate was used as component II. The proportions of the component I and the component II were 25% and 75%, respectively.

The resultant composition was extruded at 240° C. using a twin screw compounder equipped with a T-die, and was passed through a zone maintained at 180° C. so as to induce liquid-liquid phase separation. Then, a 1000 μm-thick sheet was prepared using a casting roll. The sheet extruded having a width of 350 mm was quickly cast in the longitudinal direction to reduce the width to 280 mm (20% reduction). The sheet was then stretched by 7 times in the longitudinal direction at 114° C., and by 5 times in the transverse direction at 125° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 10%. Heat setting was carried out at 130° C. Through the stretching, the width of the film was increased up to 140% of the initial width in the transverse direction. And, through the shrinking, the width was reduced by 21.4% compared to the final width at the stretching step. Physical properties of thus prepared separator are given in Table 1.

Example 2

High density polyethylene having a weight average molecular weight of $3.0 \ 10^5$ and a melting temperature of 135° C. was used as component I, and dibutyl phthalate was used as component II. The proportions of the component I and the component II were 25% and 75%, respectively.

The resultant composition was extruded at 250° C. using a twin screw compounder equipped with a T-die, and was passed through a zone maintained at 190° C. so as to induce liquid-liquid phase separation. Then, a 1500 µm-thick sheet was prepared using a casting roll. The sheet extruded having a width of 350 mm was quickly cast in the longitudinal direction to reduce the width to 270 mm (23% reduction). The sheet was then stretched by 9 times in the longitudinal direction at 118° C., and by 5 times in the transverse direction at 130° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 12%. Heat setting was carried out at 129° C. Through the stretching, the width of the film was increased up to 150% of the initial width in the transverse direction. And, through the shrinking, the width was reduced by 26.7% compared to the final width at the stretching step. Physical properties of thus prepared separator are given in Table 1.

Example 3

High density polyethylene having a weight average molecular weight of $3.8 \ 10^5$ and a melting temperature of 135° C. was used as component I, and a 1:1 mixture of paraffin oil having a dynamic viscosity of 160 cSt at 40° C. and dioctyl phthalate was used as component II. The proportions of the component I and the component II were 25% and 75%, respectively.

The resultant composition was extruded at 250° C. using a twin screw compounder equipped with a T-die, and was passed through a zone maintained at 185° C. so as to induce liquid-liquid phase separation. Then, a 1050 µm-thick sheet was prepared using a casting roll. The sheet extruded having a width of 350 mm was quickly cast in the longitudinal direction to reduce the width to 300 mm (14% reduction). The sheet was then stretched by 8.5 times in the longitudinal direction at 115° C., and by 4 times in the transverse direction at 128° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 10%. Heat setting was carried out at 129° C. Through the stretching, the width of the film was increased up to 145% of the initial width in the transverse direction. And, through the shrinking, the width was reduced by 34.5% compared to the final width at the stretching step. Physical properties of thus prepared separator are given in Table 1.

Example 4

High density polyethylene having a weight average molecular weight of $3.8 \ 10^5$ and a melting temperature of 135° C. was used as component I, and a 2:1 mixture of paraffin oil having a dynamic viscosity of 160 cSt at 40° C. and dibutyl phthalate was used as component II. The proportions of the component I and the component II were 30% and 70%, respectively.

The resultant composition was extruded at 240° C. using a twin screw compounder equipped with a T-die, and was passed through a zone maintained at 180° C. so as to induce liquid-liquid phase separation. Then, a 1900 µm-thick sheet was prepared using a casting roll. The sheet extruded having a width of 350 mm was quickly cast in the longitudinal direction to reduce the width to 310 mm (11.4% reduction). The sheet was then stretched by 9 times in the longitudinal direction at 117° C., and by 6.5 times in the transverse direction at 130° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 10%. Heat setting was carried out at 128° C. Through the stretching, the width of the film was increased up to 145% of the initial width in the transverse direction. And, through the shrinking, the width was reduced by 20.7% compared to the final width at the stretching step. Physical properties of thus prepared separator are given in Table 1.

Example 5

High density polyethylene having a weight average molecular weight of $3.0 \ 10^5$ and a melting temperature of 135° C. was used as component I, and a 1:1 mixture of paraffin oil having a dynamic viscosity of 160 cSt at 40° C. and dioctyl phthalate was used as component II. The proportions of the component I and the component II were 30% and 70%, respectively.

The resultant composition was extruded at 250° C. using a twin screw compounder equipped with a T-die, and was passed through a zone maintained at 185° C. so as to induce liquid-liquid phase separation. Then, a 600 µm-thick sheet was prepared using a casting roll. The sheet extruded having a width of 350 mm was quickly cast in the longitudinal direction to reduce the width to 270 mm (22.9% reduction). The sheet was then stretched by 7.5 times in the longitudinal direction at 116° C., and by 5 times in the transverse direction at 132° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 12%. Heat setting was carried out at 131° C. Through the stretching, the width of the film was increased up to 150% of the initial width in the transverse direction. And, through the shrinking, the width was reduced by 23.3% compared to the final width at the stretching step. Physical properties of thus prepared separator are given in Table 1.

Example 6

High density polyethylene having a weight average molecular weight of $3.8 \ 10^5$ and a melting temperature of 135° C. was used as component I, and a 1:1 mixture of oleic acid triglyceride and linolenic acid triglyceride was used as component II. The proportions of the component I and the component II were 40% and 60%, respectively.

The resultant composition was extruded at 250° C. using a twin screw compounder equipped with a T-die, and was passed through a zone maintained at 190° C. so as to induce liquid-liquid phase separation. Then, a 1000 μm-thick sheet was prepared using a casting roll. The sheet extruded having a width of 350 mm was quickly cast in the longitudinal direction to reduce the width to 300 mm (14.3% reduction). The sheet was then stretched by 8.5 times in the longitudinal direction at 120° C., and by 6 times in the transverse direction at 134° C., sequentially. The diluent was extracted from the stretched film using methylene chloride at 25-30° C. During the extraction, tension was applied in the longitudinal direction so as to induce expansion in the longitudinal direction by about 3% and shrinking in the transverse direction by about 12%. Heat setting was carried out at 132° C. Through the stretching, the width of the film was increased up to 120% of the initial width in the transverse direction. And, through the shrinking, the width was reduced by 16.7% compared to the final width at the stretching step. Physical properties of thus prepared separator are given in Table 1.

Example 7

High density polyethylene having a weight average molecular weight of $3.8 \ 10^5$ and a melting temperature of 135° C. was used as component I, and dioctyl phthalate was used as component II. The proportions of the component I and the component II were 30% and 70%, respectively.

The resultant composition was extruded at 250° C. using a twin screw compounder equipped with a T-die, and was passed through a zone maintained at 190° C. so as to induce liquid-liquid phase separation. Then, a 700 μm-thick sheet was prepared using a casting roll. The sheet extruded having a width of 350 mm was quickly cast in the longitudinal direction to reduce the width to 270 mm (22.9% reduction). The sheet was then stretched at 126° C. by 7 times in the longitudinal direction and by 4.5 times in the transverse direction, simultaneously. The diluent was extracted from the stretched film using methylene chloride at 25-30° C. During the extraction, tension was applied in the longitudinal direction so as to prevent shrinking in the longitudinal direction and induce shrinking in the transverse direction by about 8%. Heat setting was carried out at 129° C. Through the stretching, the width of the film was increased up to 140% of the initial width in the transverse direction. And, through the shrinking, the width was reduced by 28.6% compared to the final width at the stretching step. Physical properties of thus prepared separator are given in Table 1.

Comparative Example 1

High density polyethylene having a weight average molecular weight of $3.8 \ 10^5$ and a melting temperature of 135° C. was used as component I, and paraffin oil having a dynamic viscosity of 160 cSt at 40° C. was used as component II. The proportions of the component I and the component II were 35% and 65%, respectively.

The resultant composition was extruded at 210° C. using a twin screw compounder equipped with a T-die. An 850 μm-thick sheet was prepared using a casting roll. The sheet extruded having a width of 350 mm was quickly cast in the longitudinal direction to reduce the width to 310 mm (11.4% reduction). The sheet was then stretched by 6.5 times in the longitudinal direction at 116° C., and by 6 times in the transverse direction at 127° C., sequentially. The diluent was extracted from the stretched film using methylene chloride at 25-30° C. During the extraction, weak tension was applied in the longitudinal direction so as to induce shrinking in the longitudinal direction by about 3% and shrinking in the transverse direction by about 7%. Heat setting was carried out at 126° C. Through the stretching, the width of the film was increased up to 110% of the initial width in the transverse direction. And, through the shrinking, the width was reduced by 9.1% compared to the final width at the stretching step. Physical properties of thus prepared separator are given in Table 1.

Comparative Example 2

High density polyethylene having a weight average molecular weight of $3.0 \ 10^5$ and a melting temperature of 135° C. was used as component I, and a 2:1 mixture of paraffin oil having a dynamic viscosity of 160 cSt at 40° C. and dioctyl phthalate was used as component II. The proportions of the component I and the component II were 30% and 70%, respectively.

The resultant composition was extruded at 240° C. using a twin screw compounder equipped with a T-die, and was passed through a zone maintained at 180° C. so as to induce liquid-liquid phase separation. Then, a 600 μm-thick sheet was prepared using a casting roll. The sheet extruded having a width of 350 mm was quickly cast in the longitudinal direction to reduce the width to 330 mm (5.7% reduction). The sheet was then stretched by 8 times in the longitudinal direction at 118° C., and by 3 times in the transverse direction at 130° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 10%. Heat setting was carried out at 125° C., without change in the width. Physical properties of thus prepared separator are given in Table 1.

Comparative Example 3

High density polyethylene having a weight average molecular weight of $3.8 \ 10^5$ and a melting temperature of 135° C. was used as component I, and a 2:1 mixture of paraffin oil having a dynamic viscosity of 160 cSt at 40° C. and dibutyl phthalate was used as component II. The proportions of the component I and the component II were 25% and 75%, respectively.

The resultant composition was extruded at 240° C. using a twin screw compounder equipped with a T-die, and was passed through a zone maintained at 180° C. so as to induce liquid-liquid phase separation. Then, an 1800 μm-thick sheet was prepared using a casting roll. The sheet extruded having a width of 350 mm was quickly cast in the longitudinal direction to reduce the width to 335 mm (4.3% reduction). The sheet was then stretched by 8 times in the longitudinal direction at 116° C., and by 7 times in the transverse direction at 129° C., sequentially. The diluent was extracted from the stretched film using methylene chloride at 25-30° C. During the extraction, tension was applied in the longitudinal direction so as to prevent shrinking in the longitudinal direction and induce shrinking in the transverse direction by about 12%. Heat setting was carried out at 127° C. Through the stretching, the width of the film was increased up to 180% of the initial width in the transverse direction. And, through the shrinking, the width was reduced by 16.7% compared to the final width at the stretching step. Physical properties of thus prepared separator are given in Table 1.

Comparative Example 4

High density polyethylene having a weight average molecular weight of $2.1 \ 10^5$ and a melting temperature of 135° C. was used as component I, and dioctyl phthalate was used as component II. The proportions of the component I and the component II were 35% and 65%, respectively.

The resultant composition was extruded at 250° C. using a twin screw compounder equipped with a T-die, and was passed through a zone maintained at 190° C. so as to induce liquid-liquid phase separation. Then, a 600 μm-thick sheet was prepared using a casting roll. The sheet extruded having a width of 350 mm was quickly cast in the longitudinal direction to reduce the width to 300 mm (14.3% reduction). The sheet was then stretched at 128° C. by 4.5 times in the longitudinal direction and by 5 times in the transverse direction, simultaneously. The diluent was extracted from the stretched film using methylene chloride at 25-30° C. During the extraction, weak tension was applied in the longitudinal direction so as to induce shrinking in the longitudinal direction by about 3% and shrinking in the transverse direction by about 6%. Heat setting was carried out at 124° C. Through the stretching, the width of the film was increased up to 130% of the initial width in the transverse direction. And, through the shrinking, the width was reduced by 19.2% compared to the final width at the stretching step. Physical properties of thus prepared separator are given in Table 1.

Comparative Example 5

High density polyethylene having a weight average molecular weight of $3.8 \times 10^5$ and a melting temperature of 135° C. was used as component I, and a 1:1 mixture of paraffin oil having a dynamic viscosity of 160 cSt at 40° C. and dioctyl phthalate was used as component II. The proportions of the component I and the component II were 30% and 70%, respectively.

The resultant composition was extruded at 250° C. using a twin screw compounder equipped with a T-die, and was passed through a zone maintained at 190° C. so as to induce liquid-liquid phase separation. Then, a 700 μm-thick sheet was prepared using a casting roll. The sheet extruded having a width of 350 mm was quickly cast in the longitudinal direction to reduce the width to 280 mm (20.0% reduction). The sheet was then stretched by 7 times in the longitudinal direction at 118° C., and by 5 times in the transverse direction at 133° C., sequentially. The diluent was extracted from the stretched film using methylene chloride at 25-30° C. During the extraction, weak tension was applied in the longitudinal direction so as to induce shrinking in the longitudinal direction by about 3% and shrinking in the transverse direction by about 18%. Heat setting was carried out at 129° C. Through the stretching, the width of the film was increased up to 150% of the initial width in the transverse direction. And, through the shrinking, the width was reduced by 46.7% compared to the final width at the stretching step. Physical properties of thus prepared separator are given in Table 1.

TABLE 1

| Punctue strength (N/μm) | Puncture strength at high temperature (120° C. | Maximum TMA shrinkage ratio in the transverse direction (%) | | | Overcharge test | Shrinkage ratio (120° C., 1 hr) | |
|---|---|---|---|---|---|---|---|
| | | 2 mN/μm | 1.5 mN/μm | 1.3 mN/μm | | LD | TD |
| 0.24 | 0.085 | ≦0% | ≦0% | 8% | Pass | 5% | 2% |
| 0.27 | 0.094 | ≦0% | ≦0% | ≦0% | Pass | 6% | 6% |
| 0.25 | 0.088 | ≦0% | ≦0% | ≦0% | Pass | 4% | 2% |
| 0.22 | 0.072 | ≦0% | 12% | — | Pass | 6% | 9% |
| 0.24 | 0.089 | ≦0% | ≦0% | ≦0% | Pass | 4% | 4% |
| 0.33 | 0.131 | ≦0% | 7% | — | Pass | 4% | 3% |
| 0.24 | 0.082 | ≦0% | ≦0% | ≦0% | Pass | 6% | 3% |
| 0.23 | 0.060 | 19% | — | — | Pass | 14% | 17% |
| 0.13 | 0.031 | ≦0% | ≦0% | ≦0% | Pass | 10% | 25% |
| 0.21 | 0.063 | 15% | — | — | Fail | 11% | 15% |
| 0.21 | 0.043 | 28% | — | — | Pass | 9% | 8% |
| 0.22 | 0.077 | ≦0% | ≦0% | ≦0% | Pass | 5% | 0% |

| | Film thickness (μm) | Porosity (%) | Permeability (Darcy $10^{-5}$) | Average pore size (μm) | Maximum pore size (μm) |
|---|---|---|---|---|---|
| Ex. 1 | 16 | 41 | 2.42 | 0.046 | 0.066 |
| Ex. 2 | 20 | 43 | 2.93 | 0.051 | 0.072 |
| Ex. 3 | 18 | 41 | 2.46 | 0.041 | 0.063 |
| Ex. 4 | 24 | 54 | 6.37 | 0.049 | 0.075 |
| Ex. 5 | 10 | 40 | 2.72 | 0.043 | 0.065 |
| Ex. 6 | 13 | 39 | 2.51 | 0.047 | 0.069 |
| Ex. 7 | 15 | 42 | 2.57 | 0.046 | 0.070 |
| Comp. Ex. 1 | 17 | 46 | 3.41 | 0.042 | 0.060 |
| Comp. Ex. 2 | 19 | 36 | 2.23 | 0.035 | 0.051 |
| Comp. Ex. 3 | 20 | 57 | 6.92 | 0.068 | 0.111 |
| Comp. Ex. 4 | 22 | 46 | 3.64 | 0.048 | 0.071 |
| Comp. Ex. 5 | 12 | 33 | 1.64 | 0.029 | 0.044 |

The invention has been described in detail with reference to preferred embodiments thereof. However, it will be appreciated by those skilled in the art that changes may be made in these embodiments without departing from the principles and spirit of the invention, the scope of which is defined in the accompanying claims and their equivalents.

What is claimed is:

1. A microporous polyolefin film having a film thickness of 5 to 40 μm, a porosity of 30 to 60%, a permeability of $2.0 \times 10^{-5}$ to $8.0 \times 10^{-5}$ Darcy, a maximum pore size determined by the bubble point method of not more than 0.1 μm, a puncture strength of 0.20 N/μm or more at room temperature and 0.05

N/μm or more at 120° C., and a maximum shrinkage ratio in the transverse direction when subjected to TMA (thermomechanical analysis) at a thickness-normalized external force of 2 mN/μm of not more than 0%.

2. The microporous polyolefin film as set forth in claim 1, which has an average pore size measured by the half dry method of 0.02-0.06 μm.

3. The microporous polyolefin film as set forth in claim 2, which has a maximum shrinkage ratio in the transverse direction when subjected to TMA at a thickness-normalized external force of 1.5 mN/μm of not more than 0%.

4. The microporous polyolefin film as set forth in claim 3, which has a puncture strength of 0.24 N/μm or more at room temperature.

5. The microporous polyolefin film as set forth in claim 2, which has a maximum shrinkage ratio in the transverse direction when subjected to TMA at a thickness-normalized external force of 1.3 mN/μm of not more than 0%.

6. The microporous polyolefin film as set forth in claim 5, which has a puncture strength of 0.24 N/μm or more at room temperature.

7. The microporous polyolefin film as set forth in claim 2, which has a puncture strength of 0.24 N/μm or more at room temperature.

8. The microporous polyolefin film as set forth in claim 1, which has a shrinkage ratio in the transverse and longitudinal directions of not more than 10% when kept at 120° C. for an hour.

* * * * *